United States Patent [19]

Sundaramurthy

[11] Patent Number: 4,843,584
[45] Date of Patent: Jun. 27, 1989

[54] CORDIC IMPLEMENTATION OF MULTI-DIMENSIONAL PLANE ROTATION OVER THE COMPLEX FIELD

[76] Inventor: Malaiperumal Sundaramurthy, 4 Coventry Wood Rd., Bolton, Mass. 01740

[21] Appl. No.: 11,316

[22] Filed: Feb. 5, 1987

[51] Int. Cl.[4] ............................................. G06F 15/332
[52] U.S. Cl. ..................................................... 364/735
[58] Field of Search ......................................... 364/735

[56] References Cited

PUBLICATIONS

Walther, "A Unified Algorithm for Elementary Functions", Spring Joint Computer Conference, 1971, pp. 379–385.
Volder, "The CORDIC Trigonometric Computing Technique", IRE Trans. on Electronic Computers, Sep. 1959. pp. 330–334.
Sundaramurthy, M. et al., "A Custom IC For Linear Detection", Proceedings, IEEE Compcon, San Francisco, Mar. 1986.
Despain, A. M., "Fourier Transform Computers Using CORDIC Iterations", IEEE Transactions on Computers, vol. c–23, No. 10, Oct. 1974, pp. 993–1001.

Primary Examiner—Gary V. Harkcom
Assistant Examiner—Dale M. Shaw
Attorney, Agent, or Firm—Joseph S. Iandiorio

[57] ABSTRACT

CORDIC rotations over the complex field are implemented with interconnected CORDIC blocks. In one implementation, six CORDIC blocks are arranged in three stages, each stage having two of the CORDIC blocks to generate the rotated elements of a complex vector. In another embodiment, four CORDIC blocks are utilized arranged in two stages, each stage having two of the CORDIC blocks.

15 Claims, 4 Drawing Sheets

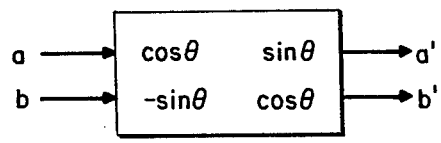
FIG. 1: CORDIC rotation over real field.
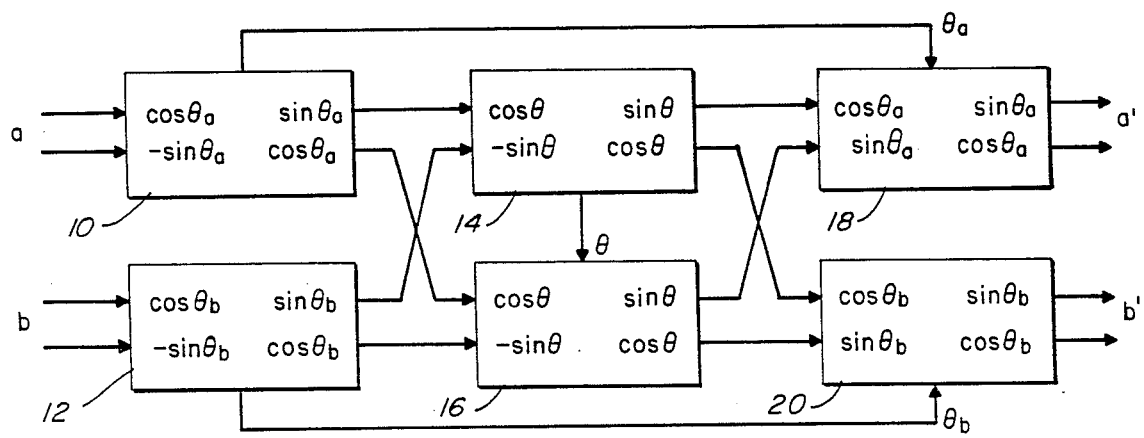
FIG. 2: CORDIC implementation of (i,j)-plane rotation over the complex field.
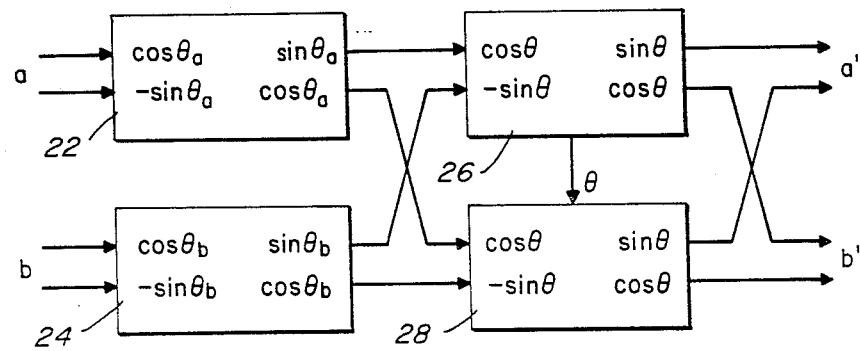
FIG. 3: A simplified CORDIC realization for (i,j)-plane rotation over the complex field.

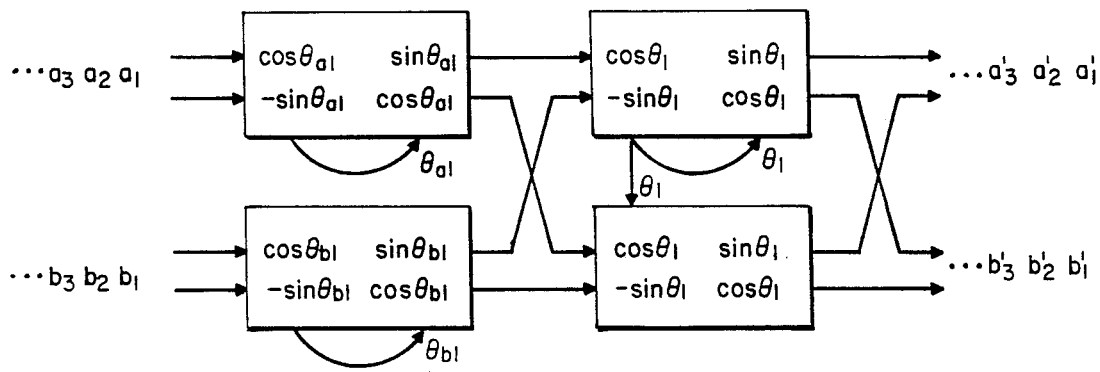
FIG. 4: CORDIC rotation over the complex field operating on sequence of inputs.
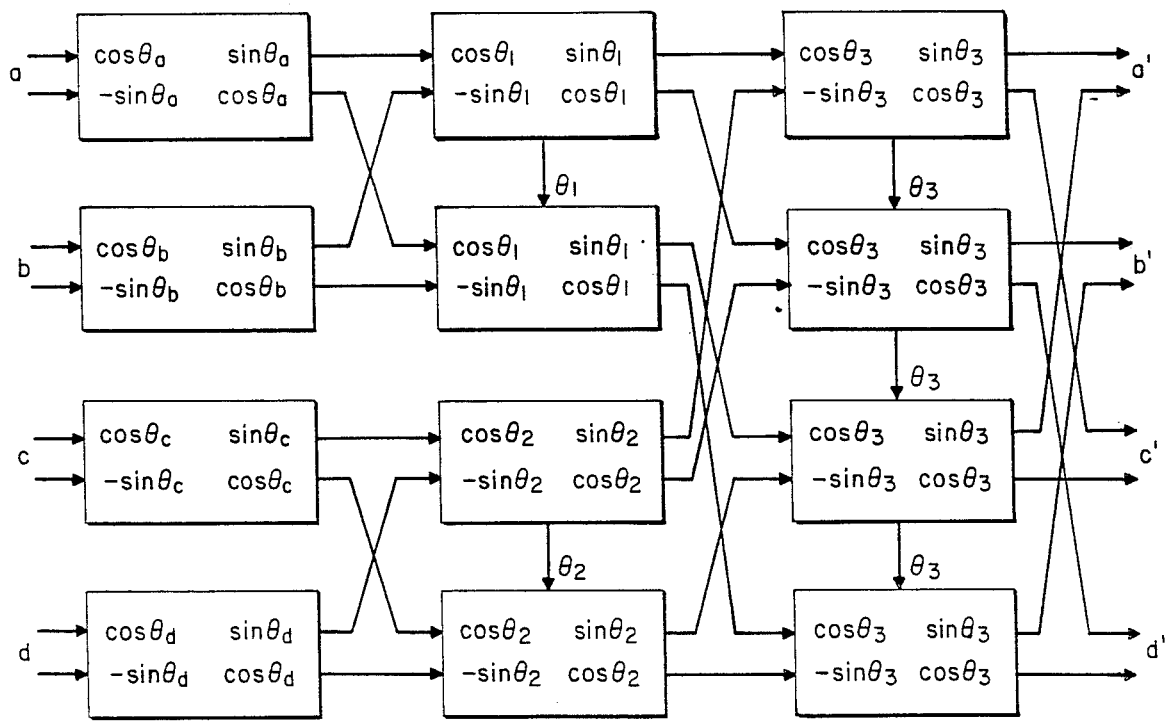
FIG. 5: CORDIC rotation in 4-D plane over complex field.

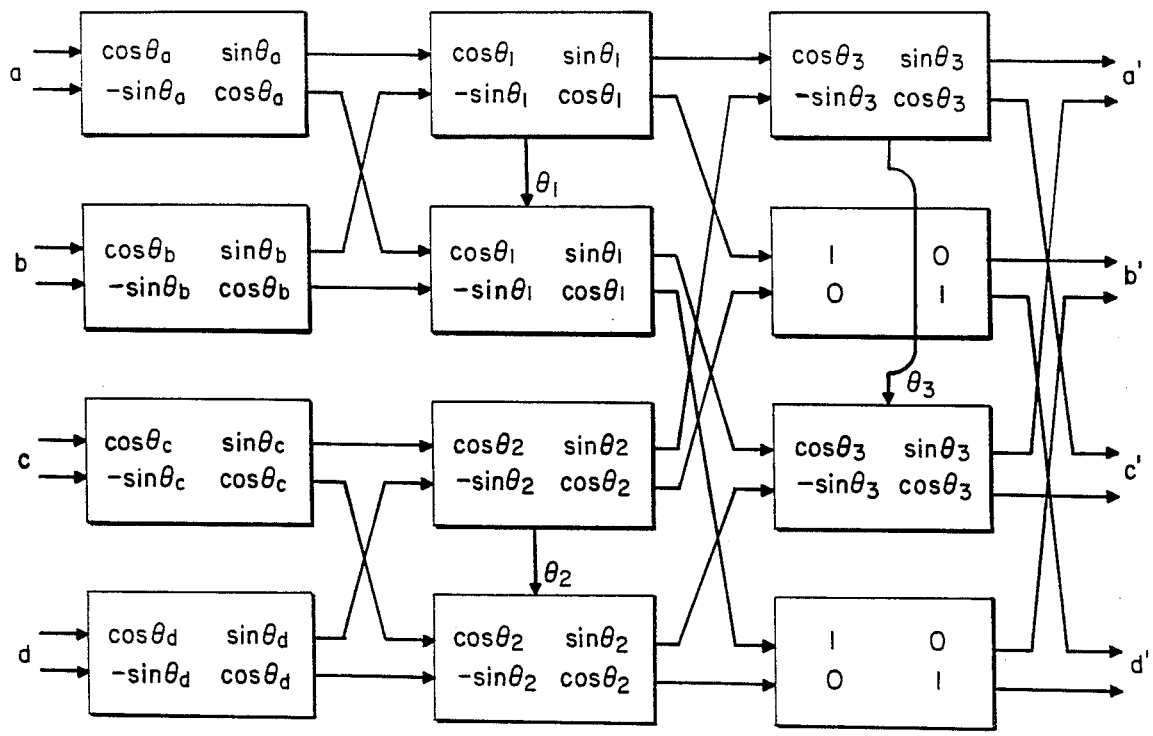
FIG. 6: CORDIC rotation in 4-D plane over complex field.
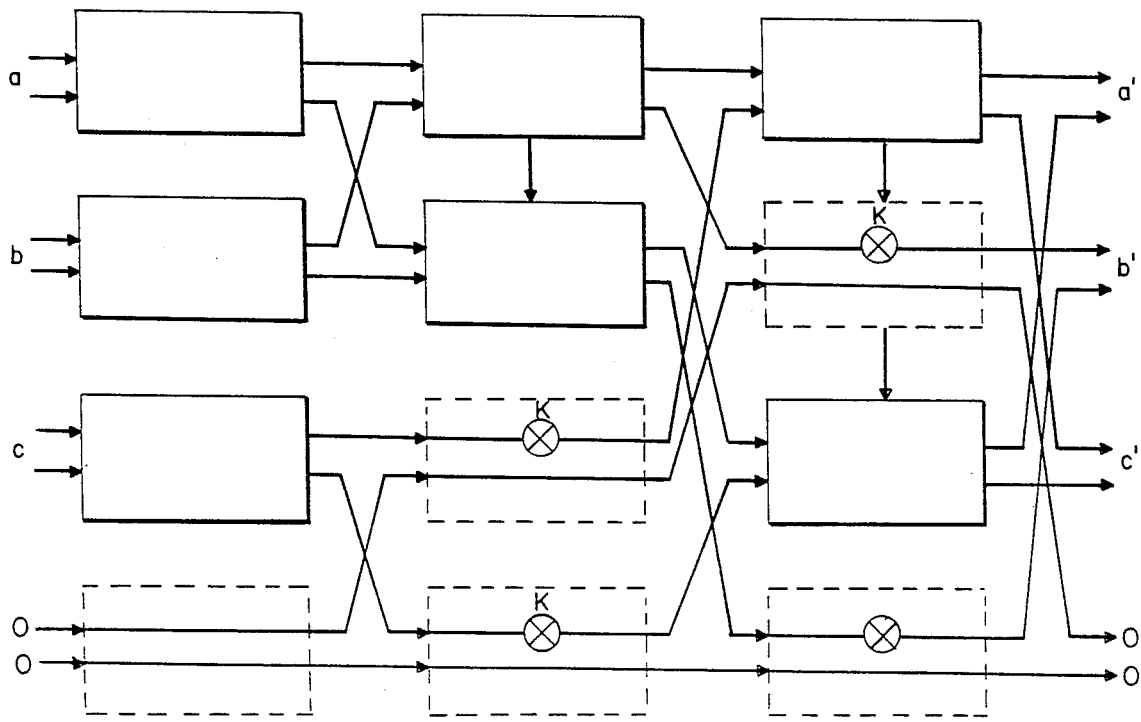
FIG. 7: CORDIC rotation in 3-D plane over complex field.

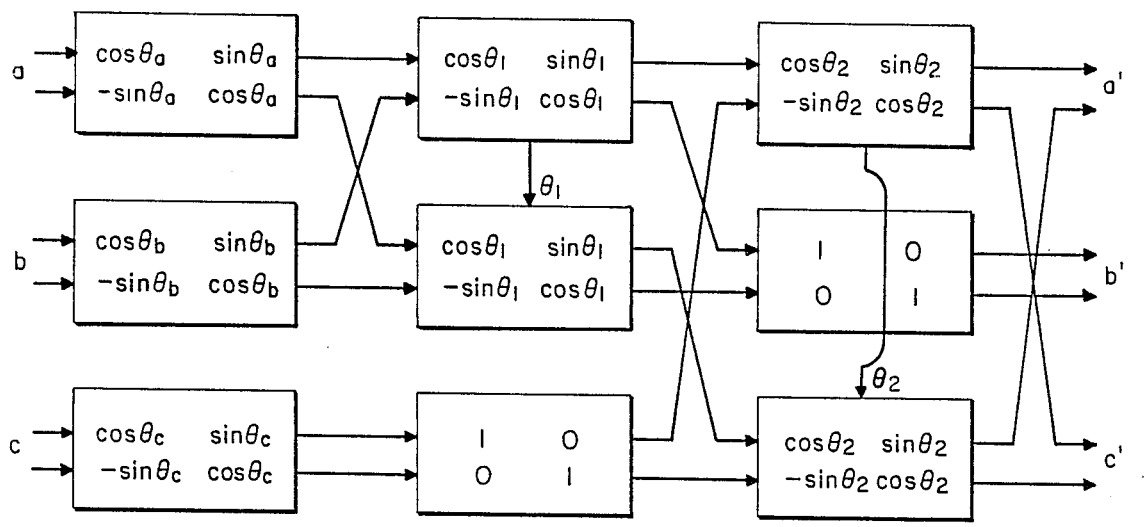
FIG. 8: Simplified 3-D CORDIC architecture.
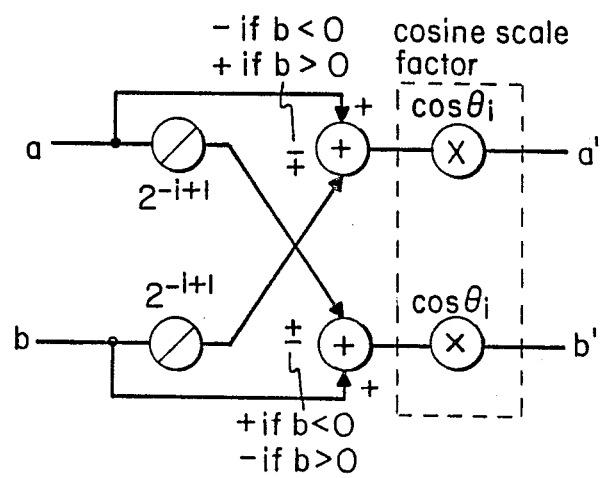
FIG. 9: A scheme to rotate the vector by an angle $\theta$.
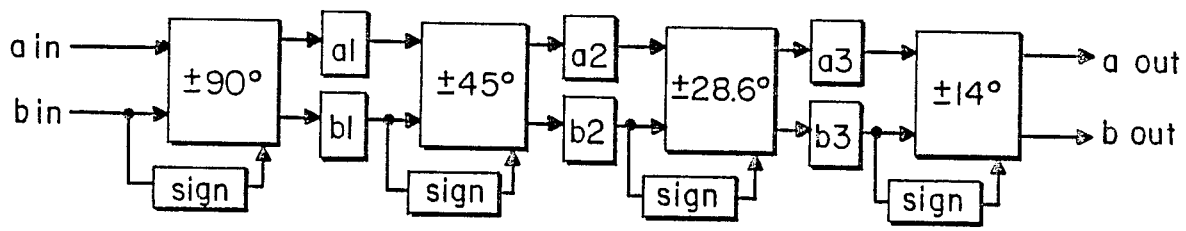
FIG. 10: Four stages of CORDIC iterations implemented using pipelined architecture.

CORDIC IMPLEMENTATION OF MULTI-DIMENSIONAL PLANE ROTATION OVER THE COMPLEX FIELD

BACKGROUND OF THE INVENTION

This invention relates to CORDIC rotations, and more particularly to CORDIC implementations for rotations over the complex field.

CORDIC algorithms are known for rotating complex numbers over the real field. It is intended that the term rotation as used throughout this specification encompass more general transformations. The acronym CORDIC comes from coordinate rotation digital computation. CORDIC algorithms perform rotations using only bit operations such as shifts and adds. Multiplications are eliminated. In CORDIC algorithms, a rotation is broken up ito a seqeunce of minirotations whose sum equals the desired rotation. As is well known, each of the mini rotations can be computed utilizing only bit operations. For a discussion of CORDIC algorithms, see, "Fourier Transform Computers Using CORDIC Iterations" IEEE Transactions on Computers, Vol. C-23, No. 10, October 1974.

It is well known that simple CORDIC hardware architecture can be used to implement (i,j)—plane (2-dimensional) rotations over the real field. Heretofore, however, there was no known CORDIC architectures for implementing (i,j)—plane rotations over the complex field.

It is therefore an object of the present invention to provide a CORDIC implementation for a known transformation matrix for complex field rotations.

Yet another object of the invention is to provide a CORDIC implementation for a different transformation matrix for (i,j)—plane rotations over the complex field.

Still another object of the invention is an optimum CORDIC implementation which requires only four times the hardware that is needed for rotation over the real field.

SUMMARY OF THE INVENTION

These and other objects of the invention are achieved with apparatus for implementing CORDIC rotations over the complex field. In one embodiment, six CORDIC blocks are arranged in three stages each having two of the CORDIC blocks, the blocks being interconnected to generate the rotated elements of a complex vector according to the transformation $$\begin{bmatrix} a' \\ b' \end{bmatrix} = \begin{bmatrix} e^{i\theta a} & 0 \\ 0 & e^{i\theta b} \end{bmatrix} \begin{bmatrix} \cos\theta & \sin\theta \\ -\sin\theta & \cos\theta \end{bmatrix} \begin{bmatrix} e^{-i\theta a} & 0 \\ 0 & e^{-j\theta b} \end{bmatrix} \begin{bmatrix} a \\ b \end{bmatrix}.$$

In another embodiment, four CORDIC blocks are arranged in two stages, each having two blocks, the blocks being interconnected to generate the rotated elements of a complex vector according to the transformation $$\begin{bmatrix} a' \\ b' \end{bmatrix} = \begin{bmatrix} \cos\theta & \sin\theta \\ -\sin\theta & \cos\theta \end{bmatrix} \begin{bmatrix} e^{-i\theta a} & 0 \\ 0 & e^{-j\theta b} \end{bmatrix} \begin{bmatrix} a \\ b \end{bmatrix}.$$

This second embodiment requires only four times the hardware that is needed for rotation over the real field.

BRIEF DESCRIPTION OF THE DRAWING

The invention disclosed herein will be understood better with reference to the drawing of which:

FIG. 1 is a block diagram of a prior art CORDIC rotation over the real field;

FIG. 2 is a block diagram of a CORDIC implementation of (i,j)—plane rotation over the complex field;

FIG. 3 is another CORDIC realization for (i,j)—plane rotation over the complex field;

FIG. 4 is a block diagram of CORDIC rotation over the complex field operating on a sequence of inputs;

FIG. 5 is a block diagram of CORDIC rotation in a 4-D plane over the complex field;

FIG. 6 is a block diagram of CORDIC rotation in a 4-D plane over the complex field;

FIG. 7 is a block diagram of a CORDIC rotation in 3-D plane over the complex field;

FIG. 8 is a block diagram of a simplified 3-D CORDIC architecture;

FIG. 9 is a schematic diagram of a CORDIC block for rotating a vector; and

FIG. 10 is a block diagram illustrating four stages for CORDIC iterations.

DESCRIPTION OF THE PREFERRED EMBODIMENT

First of all, a brief discussion of CORDIC rotations over the real field will be given. Consider a 2-dimensional vector [a,b]T. If the elements a and b are over the real field then the rotated vector [a',b']T is given by $$\begin{bmatrix} a' \\ b' \end{bmatrix} = \begin{bmatrix} \cos\theta & \pm\sin\theta \\ \mp\sin\theta & \cos\theta \end{bmatrix} \begin{bmatrix} a \\ b \end{bmatrix}. \quad (1)$$

The sign in Equation 1 is selected depending on direction of rotation. this is an orthogonal transformation that can be easily implemented using CORDIC rotations. FIG. 1 illustrates such an implementation well known to those skilled in the art. As will be appreciated, the rotation represented in FIG. 1 would be effected by a series of minirotations, each one of which requiring only digital bit operations. By selecting the angle $\theta$ such that $\theta$=phase angle of (a+jb) one can make b' of the transformed vector disappear giving $$\begin{bmatrix} a' \\ 0 \end{bmatrix} = \begin{bmatrix} \cos\theta & \sin\theta \\ -\sin\theta & \cos\theta \end{bmatrix} \begin{bmatrix} a \\ b \end{bmatrix}. \quad (2)$$

Rotation over the complex field, with which the present invention is concerned, will now be described. If a and b are defined over the complex field, then one needs to rotate the vector [a,b]T by a complex angle $\theta$ to make b' to be zero. One such transformation is given by J. J. Dongarra et al., in Linpack Users' Guide, pp. 10.9–10.10, SIAM, Philadelphia, 1979. An equivalent of this transformation is $$\begin{bmatrix} a' \\ b' \end{bmatrix} = \begin{bmatrix} \cos\theta & (e^{j\theta a} \cdot e^{-j\theta b} \cdot \sin\theta) \\ (-e^{-j\theta a} \cdot e^{j\theta b} \cdot \sin\theta) & \cos\theta \end{bmatrix} \begin{bmatrix} a \\ b \end{bmatrix} \quad (3)$$

where $\theta_a$ = phase angle of a,
$\theta_b$ = phase angle of b.

$$\text{and } \theta = \tan^{-1} \frac{|b|}{|a|}.$$

Heretofore, no CORDIC implementation was known to represent the above transformation. A CORDIC implementation is possible when equation (3) is expressed in a factored form as $$\begin{bmatrix} a' \\ b' \end{bmatrix} = \begin{bmatrix} e^{i\theta_a} & 0 \\ 0 & e^{i\theta_b} \end{bmatrix} \begin{bmatrix} \cos\theta & \sin\theta \\ -\sin\theta & \cos\theta \end{bmatrix} \begin{bmatrix} e^{-i\theta_a} & 0 \\ 0 & e^{-j\theta_b} \end{bmatrix} \begin{bmatrix} a \\ b \end{bmatrix} \quad (4)$$

Starting with a vector [a,b]T one can form a 3-step CORDIC implementation as shown in FIG. 2. As shown in FIG. 2, there are six CORDIC blocks 10–20 to realize the (i,j)—plane rotation over the complex field. This implementation would require 6-times the hardware of a rotation over the real field as shown in FIG. 1.

A further simplification of the hardware for complex field rotations beyond that shown in FIG. 2 is possible utilizing an alternate transformation. Such a transformation has the form $$\begin{bmatrix} a' \\ b' \end{bmatrix} = \begin{bmatrix} e^{-i\theta_a} \cdot \cos\theta & e^{-i\theta_b} \cdot \sin\theta \\ -e^{-i\theta_a} \cdot \sin\theta & e^{-i\theta_b} \cdot \cos\theta \end{bmatrix} \begin{bmatrix} a \\ b \end{bmatrix}. \quad (5)$$

The transformation of equation (5) is, once again, orthogonal. If one chooses the angles as before, one can force the transformed element b' to disappear. As a side benefit a' from this new transformation will be real (not so in the previous case). Having a' real may be useful in some applications where division by a' is to be performed. Thus, for the right set of angles one can have $$\begin{bmatrix} a' \\ 0 \end{bmatrix} = \begin{bmatrix} e^{-i\theta_a} \cdot \cos\theta & e^{-i\theta_b} \cdot \sin\theta \\ -e^{-i\theta_a} \cdot \sin\theta & e^{-i\theta_b} \cdot \cos\theta \end{bmatrix} \begin{bmatrix} a \\ b \end{bmatrix}. \quad (6)$$

Equation (6) can be expressed in a factored form as $$\begin{bmatrix} a' \\ b' \end{bmatrix} = \begin{bmatrix} \cos\theta & \sin\theta \\ -\sin\theta & \cos\theta \end{bmatrix} \begin{bmatrix} e^{-i\theta_a} & 0 \\ 0 & e^{-j\theta_b} \end{bmatrix} \begin{bmatrix} a \\ b \end{bmatrix}. \quad (7)$$

Note, that equation (7) is similar to equation (4) except for the missing leftmost factor in FIG. 4. The transformation of equation (5) permits a 2-step CORDIC implementation which is shown in FIG. 3. As shown in FIG. 3, only four CORDIC blocks 22–28 are required. Note that the FIG. 3 implementation eliminates the third stage of the CORDIC rotation of FIG. 2. Not only does the 2-step implementation of FIG. 3 require only four CORDIC blocks, but it is also optimum in the sense that, for rotations over the complex field, it uses only 4-times the hardware that is needed for (i,j)—plane rotations over the real field.

In a typical application, one may have the hardware compute and store all the angles of rotations using the first set of inputs, say, [$a_1,b_1$]T and then apply the same angles of rotations to all the inputs that follow. This situation is illustrated in FIG. 4.

So far, the discussion has been limited to plane rotations only in the 2-dimensional plane. The techniques disclosed herein will now be extended to a general N-dimensional plane. FIG. 5, for example, gives the CORDIC implementation for a 4-dimensional plane rotation over the complex field. One transformation for the architecture shown in FIG. 5 can be shown to be $$\begin{bmatrix} a' \\ b' \\ c' \\ d' \end{bmatrix} = \begin{bmatrix} \cos\theta_3 & 0 & \sin\theta_3 & 0 \\ 0 & \cos\theta_3 & 0 & \sin\theta_3 \\ -\sin\theta_3 & 0 & \cos\theta_3 & 0 \\ 0 & -\sin\theta_3 & 0 & \cos\theta_3 \end{bmatrix} \begin{bmatrix} \cos\theta_1 & \sin\theta_1 & \bigcirc \\ -\sin\theta_1 & \cos\theta_1 & \\ \bigcirc & \cos\theta_2 & \sin\theta_2 \\ & -\sin\theta_2 & \cos\theta_2 \end{bmatrix} \begin{bmatrix} e^{-i\theta_a} & \bigcirc \\ & e^{-i\theta_b} \\ \bigcirc & e^{-i\theta_c} \\ & & e^{-j\theta_d} \end{bmatrix} \begin{bmatrix} a \\ b \\ c \\ d \end{bmatrix} \quad (8)$$

which is in the factored form. It should be noted that the symbol $\bigcirc$ in equations 8 and 10–12 represents a plurality of matrix elements each of which has a value of zero. The angles $\theta_a$, $\theta_b$, $\theta_c$, $\theta_d$, $\theta_1$, $\theta_2$, and $\theta_3$ can be chosen such that the transformed vector is of the form [a'000]T. These angles are implied from the way the flow graph is drawn. $\theta_3$, for example, is given by $$\theta_3 = \tan^{-1} \frac{\sqrt{|c|^2 + |d|^2}}{\sqrt{|a|^2 + |b|^2}}. \quad (9)$$

The above result is very powerful in the sense that one now has a CORDIC implementation for a Householder-like transformation where an N-dimensional vector over the complex field is reduced to a single real element by simultaneous annihilation of 2N-1 real elements. The hardware, however, remains extremely simple. In applications where one can ignore the data independent CORDIC scale factors, the entire operation can be realized by numerically simple shifts and adds.

Without compromising any of the needed properties, the transformation of equation (8) can be generalized as $$\begin{bmatrix} a' \\ b' \\ c' \\ d' \end{bmatrix} = \begin{bmatrix} \cos\theta_3 & 0 & \sin\theta_3 & 0 \\ 0 & \cos\theta_4 & 0 & \sin\theta_4 \\ -\sin\theta_3 & 0 & \cos\theta_3 & 0 \\ 0 & -\sin\theta_4 & 0 & \cos\theta_4 \end{bmatrix} \begin{bmatrix} \cos\theta_1 & \sin\theta_1 & \bigcirc \\ -\sin\theta_1 & \cos\theta_1 & \\ \bigcirc & \cos\theta_2 & \sin\theta_2 \\ & -\sin\theta_2 & \cos\theta_2 \end{bmatrix} \begin{bmatrix} e^{-i\theta_a} & \bigcirc \\ & e^{-i\theta_b} \\ \bigcirc & e^{-i\theta_c} \\ & & e^{-j\theta_d} \end{bmatrix} \begin{bmatrix} a \\ b \\ c \\ d \end{bmatrix} \quad (10)$$

The transformation is once again orthogonal and one can choose angles $\theta_a$, $\theta_b$, $\theta_c$, $\theta_d$, $\theta_1$, $\theta_2$, $\theta_3$, and $\theta_4$ such that the transformed vector is of the form [a'000]T. All angles except $\theta_4$ are computed using non-trivial data sets. $\theta_4$, on the otherhand, is completely arbitrary. For convenience, $\theta_4$ will be chosen to be 0. Thus, equation (10) gets modified as $$\begin{bmatrix} a' \\ b' \\ c' \\ d' \end{bmatrix} = \begin{bmatrix} \cos\theta_3 & 0 & \sin\theta_3 & 0 \\ 0 & 1 & 0 & 0 \\ -\sin\theta_3 & 0 & \cos\theta_3 & 0 \\ 0 & 0 & 0 & 1 \end{bmatrix} \begin{bmatrix} \cos\theta_1 & \sin\theta_1 & & \\ -\sin\theta_1 & \cos\theta_1 & & \\ & & \cos\theta_2 & \sin\theta_2 \\ & & -\sin\theta_2 & \cos\theta_2 \end{bmatrix} \begin{bmatrix} e^{-i\theta a} & & & \\ & e^{-i\theta b} & & \\ & & e^{-i\theta c} & \\ & & & e^{-j\theta d} \end{bmatrix} \begin{bmatrix} a \\ b \\ c \\ d \end{bmatrix} \quad (11)$$

A simplified hardware implementation for the transformation of equation (11) is shown in FIG. 6. A can be seen, the number of non-trivial CORDIC blocks is reduced to 10 as opposed to the 12 blocks that are used in FIG. 5. In general, this idea of making all arbitrary angles zero can result in large savings in the number of needed CORDIC blocks. For an N-dimensional case where N is a power of 2, it can be shown that only 3N-2 CORDIC blocks are needed.

The above savings in the number of needed CORDIC blocks does not eliminate the need to either compensate or take care of the multiplication by the data independent CORDIC scale factor K. For a larger dimensional case, however, one may be able to group several of the scale factors together as one constant $K^n$ where integer n depends on the position of the data in the flow graph. Unless one can accept data skew, the requirement for uniform latency will prevent the total simplification of CORDIC blocks. However, if one is to implement the rotations in software the simplifications will shown significant improvement in speed of computations.

As a side benefit, the above simplification offers some clue as to how one can handle cases when N is not a power of 2 in an efficient manner. Consider the case of 3-D plane rotation using 4-D architectures with appended zeros. This is shown in FIG. 7. Note that, because of the simplification, the appended zeros come out of the circuit without any effect. This means that the whole process of appending zeros can be eliminated altogether. The simplified hardware is shown in FIG. 8. Here, the legs with K as the CORDIC scale factors have been paired together into a set of two zero angle CORDIC blocks. The transformation for the simplified architecture of FIG. 8 can be shown to be $$\begin{bmatrix} a' \\ b' \\ c' \end{bmatrix} = \begin{bmatrix} \cos\theta_2 & 0 & \sin\theta_2 \\ 0 & 1 & 0 \\ -\sin\theta_2 & 0 & \cos\theta_2 \end{bmatrix} \begin{bmatrix} \cos\theta_1 & \sin\theta_1 & 0 \\ -\sin\theta_1 & \cos\theta_1 & 0 \\ 0 & 0 & 1 \end{bmatrix} \begin{bmatrix} e^{-j\theta a} & & \\ & e^{-j\theta b} & \\ & & e^{-j\theta c} \end{bmatrix} \begin{bmatrix} a \\ b \\ c \end{bmatrix} \quad (12)$$

CORDIC blocks with zero angle rotations are represented by the identity matrices. They serve two purposes: one is to compensate for the CORDIC scale factors and the other is to give equal latencies to all three complex outputs.

As should be clear from the above disclosure, the CORDIC rotations described herein are effected by interconnecting CORDIS blocks such as that shown in FIG. 1. FIG. 9 shows a hardware implementation for rotating a vector by an angle $\theta$. FIG. 10 shows four stages of CORDIC iterations implemented using pipelined architecture. CORDIC rotations are implemented by means of chips. For examlpe, see G. L. Haviland and A. A. Tuszynski, "A CORDIC Arithmetic Processor Chip", IEEE Trans. on Computers, Vol. C-29, No. 2, pp. 68-79, February 1980, and M. Sundaramurthy, "A Custom IC For Linear Detection", Proceedings IEEE COMPCON, San Francisco, March 1986.

All of the techniques discussed so far are for circular rotations. The techniques disclosed herein may also be utilized for linear and hyperbolic rotations over the complex field. For hyperbolic rotations, the trigonometric functions used for circular rotations are replaced by the appropriate hyperbolic functions as will be readily appreciated by those skilled in the art. It is recognized that modifications and variations of the present invention will occur to those skilled in the art and it is intended that all such modifications and variations be included within the scope of the appended claims.

What is claimed is:

1. An apparatus for implementing Cordic rotations on at least two complex numbers defining a vector, comprising:

a plurality of Cordic rotation blocks, arranged in at least first and second stages, each block having at least two inputs and including means for operating on the inputs to rotate the vector defined by the inputs by a selected angle, and to provide at least two outputs corresponding to the rotated vector;

said first stage including first and second Cordic blocks for receiving said two complex numbers as inputs, and supplying first and second pairs of intermediate Cordic rotated outputs to a second stage;

said second stage including at least third and fourth Cordic blocks;

said third block for receiving as a first input a first intermediate Cordic rotation output of said first block and for receiving as a second input a first intermediate Cordic rotation output of said second block, and for supplying an angle theta signal to said fourth block to command Cordic rotation of the inputs to said fourth block based on said angle theta signal;

said fourth Cordic block receiving as a first input a second intermediate Cordic rotation output of said first block and for receiving as a second input a second intermediate Cordic rotation output of said second block; and said third and fourth blocks generating, based on said angel theta signal, at least two pair of Cordic rotation outputs which, when combined, establish Cordic rotation values for said complex numbers.

2. A system for implementing Cordic rotations on at least two numbers defining a vector, at least one number being a complex number having two components, comprising:

a plurality of Cordic rotation block means, arranged in at least first and second stages, each block means having at least two inputs and including means for operating on the inputs to rotate the vector defined by the inputs by a selected angle, and to provide at least two outputs corresponding to the rotated vector;

said first stage having at least a first Cordic block means for receiving said two components of said complex number as inputs, and supplying first and second Cordic rotated outputs to a second stage;

said second stage including at least second and third Cordic block means;

said second block means for receiving as a first input said first Cordic rotation output of said first block means and for receiving as a second input a first component of said second number, and for supplying an angle theta signal to said third block means to command Cordic rotation of the inputs to said third block means based on said angle theta signal;

said third Cordic block means receiving as a first input said second output of said first block means and as a second input a second component of said second number; and said second and third blocks means generating, based on said angle theta signal, Cordic rotation outputs which, when combined, establish Cordic rotation values for said first complex number and said second number.

3. The system of claim 2 in which said second number is a real number and said first component of said second number is said real number, and said second component of said second number is zero.

4. The system of claim 2 in which said first stage further includes an additional Cordic block means for receiving as input said second number and for supplying first and second Cordic rotated outputs to said second stage.

5. The system of claim 4 in which said second number is a complex number.

6. The system of claim 2 in which said additional block means is defined as a fourth block and said first output of said fourth block means is received as said second input to said second block means, and said second output is received as said second input to said third block means.

7. The system of claim 2 further including a third stage having at least two cordic block means for receiving as input intermediate Cordic rotated values from said second stage and for generating Cordic rotation outputs which, when combined, establish Cordic rotation values for said at least two numbers.

8. The system of claim 7 in which at least one of said Cordic block means of said third stage supplies as output an angle signal to at least a second Cordic block means of said third stage, to command Cordic rotation of said inputs to said second block means based on said angle signal.

9. The system of claim 7 in which at least one Cordic block means of said first stage supplies as output an angle signal to at least one Cordic block means of said third stage, to command Cordic rotation of said inputs to said at least one block means of said third stage based on said angle signal.

10. An apparatus for implementing Cordic rotations on at least two complex numbers comprising:

a plurality of Cordic rotation blocks, arranged in at least two stages, each block having at least two inputs and including means for operating on the inputs to rotate a vector defined by the inputs by a selected angle and to provide outputs at least corresponding to the rotated vector;

said two stages including a first stage having at least two cordic blocks for receiving as input components of at least two complex numbers and for supplying as output to said second stage intermediate generated Cordic rotated values; and said second stage including at least two Cordic blocks for receiving as input said intermediate generated Cordic rotated values and for generating Cordic rotation outputs which, when combined, establish Cordic rotation values for said at least two complex numbers.

11. The apparatus of claim 10 in which at least one Cordic block of said second stage supplies as output an angle theta signal to at least a second Cordic block of said second stage.

12. A system for implementing Cordic rotations on a plurality of complex numbers comprising:

a plurality of Cordic rotation block means arranged in at least three stages, each block means having at least two inputs and including means for operating on the inputs to rotated a vector defined by the inputs by a selected angle and to provide outputs at least corresponding to the rotated vector;

said first stage having at least two Cordic block means for receiving as input components of at least two complex numbers and for supplying as output to a second stage, intermediate Cordic rotated values;

said second stage including at least two Cordic block means for receiving as input said intermediate Cordic rotated values, and for supplying as output to a third stage, at least second intermediate Cordic rotated values; and said third stage including at least two Cordic block means for receiving as input said second intermediate Cordic rotated values and for generating Cordic rotation outputs which, when combined, establish Cordic rotation values for said at least two complex numbers.

13. The apparatus of claim 12 in which at least one Cordic block means of said second stage supplies as output an angle theta signal to at least a second Cordic block means of said second stage to command Cordic rotation of said input to said block based on said angle theta signal.

14. The apparatus of claim 12 in which at least one Cordic block means of said third stage supplies as output, an angle signal, to at least a second Cordic block means of said third stage to command Cordic rotation of said input to said block means based on said angle signal.

15. The apparatus of claim 12 in which at least one Cordic block means of said first stage supplies as output, an angle signal, to at least one Cordic block means of said third stage.

* * * * *